US009312755B2

(12) United States Patent
Wang et al.

(10) Patent No.: US 9,312,755 B2
(45) Date of Patent: Apr. 12, 2016

(54) CHARGE PUMP POWER SAVINGS

(71) Applicant: QUALCOMM Incorporated, San Diego, CA (US)

(72) Inventors: Le Wang, San Diego, CA (US); Vijayakumar Dhanasekaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/785,601

(22) Filed: Mar. 5, 2013

(65) Prior Publication Data

US 2014/0253180 A1 Sep. 11, 2014

(51) Int. Cl.
| H03B 1/00 | (2006.01) |
| H03K 3/00 | (2006.01) |
| H02M 3/07 | (2006.01) |

(52) U.S. Cl.
CPC .......... *H02M 3/07* (2013.01); *H02M 2003/071* (2013.01)

(58) Field of Classification Search
CPC .......... H03K 17/04126; H03K 17/063; H03K 2217/0036; H03K 17/601; H03K 17/0826
USPC ................................. 327/108–112
See application file for complete search history.

(56) References Cited

U.S. PATENT DOCUMENTS 6,891,427 B2 *  5/2005  Tsutsui ............... H02M 1/36
                                                  327/537
7,528,828 B2     5/2009  Nakajima 8,547,140 B1 *  10/2013  Faucher et al. ............... 326/83
8,593,211 B2 *  11/2013  Forghani-Zadeh et al. ... 327/427
2012/0170770 A1  7/2012  Lesso et al.
2012/0236444 A1  9/2012  Srivastava et al.

FOREIGN PATENT DOCUMENTS

JP          10041815 A      2/1998

OTHER PUBLICATIONS

Den Besten, et al., "Embedded 5V-to-3.3V Voltage Regulator for Supplying Digital IC's in 3.3V CMOS Technology," IEEE Journal of Solid-State Circuits, vol. 33, No. 7, pp. 956-962, Jul. 1998.

* cited by examiner

*Primary Examiner* — Diana J Cheng

(74) *Attorney, Agent, or Firm* — Arent Fox LLP

(57) ABSTRACT

Exemplary embodiments are directed to systems, devices, methods, and computer-readable media for reducing static and dynamic power consumption of a charge pump. In one embodiment, a device may include a plurality of switches, each switch of the plurality having a gate coupled to a dedicated driver of a plurality of drivers. The device may further include at least one clamp switch coupled to at least one driver of the plurality of drivers and configured to adjust a rail voltage of the at least one driver if an input voltage is greater than a threshold voltage. In another embodiment, the device may include a plurality of multiplexers, each multiplexer of the plurality of multiplexers coupled to a portion of an associated switch of the plurality of switches and configured to disable the portion of the associated switch if a clock frequency of the charge pump is below a threshold frequency.

28 Claims, 8 Drawing Sheets

CHARGE PUMP POWER SAVINGS

BACKGROUND

1. Field

The present invention relates generally to charge pumps. More specifically, the present invention relates to systems, devices, methods, and computer-readable media for reducing dynamic and static power consumption of a charge pump.

2. Background

Charge pumps are commonly utilized in electronic circuitry to step a given supply voltage level up or down, and/or to invert the supply voltage to an inverse voltage level to power a load. A charge pump may find application in, for example, an amplifier architecture, wherein one or more supply voltages provided to an amplifier may be varied depending on the level of an input signal to be amplified. Charge pumps may also be employed to power other types of loads besides amplifiers.

In conventional charge pumps (e.g., a negative charge pump), a turn-on voltage of each switch of a charge pump needs to be sufficiently large to achieve better efficiency. Therefore, voltage buffers may be used to increase switch gate-to-source voltages ($V_{gs}$) above a supply voltage ($V_{DD}$). However, increasing gate-to-source voltages consumes static power. For high-frequency clock input, this may be acceptable since the switching power is dominant. For lower-frequency clock input, quiescent current dissipation is not desirable for extending the battery life.

A need exists for reducing charge pump power consumption. More specifically, a need exists for systems, devices, methods, and computer-readable media for reducing dynamic and static power consumption of a charge pump.

DETAILED DESCRIPTION

Figure 1:
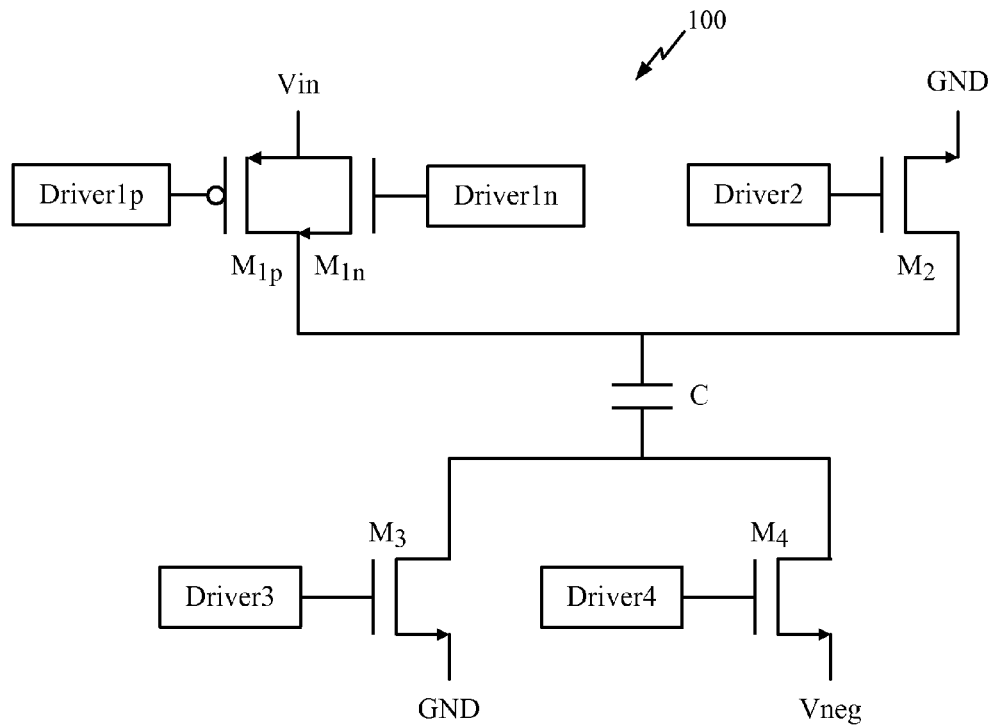
FIG. 1 illustrates a circuit diagram of a charge pump including switch implementation, according to an exemplary embodiment of the present invention.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Exemplary embodiments, as described herein, are directed to devices, systems, methods, and computer-readable media for reducing static and dynamic power consumption of a charge pump. According to one exemplary embodiment, a charge pump voltage level (e.g., an input voltage or an output voltage of the charge pump) may be compared with one or more voltage thresholds to determine whether the charge pump should operate in a power saving mode. When the voltage level (e.g., the input voltage or the output voltage of a charge pump) is less than a threshold voltage, one or more voltage generators and/or buffers within the charge pump may be turned off, and the output voltage and supply voltage may be used to directly supply one or more switch clock drivers, thus reducing static power consumption. When the voltage level (e.g., the input voltage or the output voltage of a charge pump) is higher than a threshold voltage, the one or more voltage generators and/or buffers may limit voltage stress across one or more switches within the charge pump, one or more switch clock drivers within the charge pump, or any combination thereof. As will be explained more fully below, two voltage thresholds may be used to add hysteresis to prevent mis-triggering. Stated another way, a first voltage threshold may be used to determine when to transition into a power savings mode and a second voltage threshold may be use to determine when to transition out of the power savings mode.

According to another exemplary embodiment, a clock frequency of a charge pump may be compared with one or more frequency thresholds. When the clock frequency is less than a threshold frequency, at least a portion of one or more switches within the charge pump may be disabled since charge pump efficiency is less related to switch sizes at lower clock frequencies, thus reducing dynamic power consumption.

Other aspects, as well as features and advantages of various aspects, of the present invention will become apparent to those of skill in the art though consideration of the ensuing description, the accompanying drawings and the appended claims.

FIG. 1 illustrates a charge pump 100, in accordance with an exemplary embodiment of the present invention. As illustrated, charge pump 100 includes a plurality of switches, which are shown as transistors M1-M4. It is noted that transistor M1 comprises a complimentary switch including transistor $M_{1p}$ and transistor $M_{1n}$. Further, each transistor M1-M4 is coupled to at least one clock driver. More specifically, a gate of transistor $M_{1p}$ is coupled to Driver1p, a gate of transistor $M_{1n}$ is coupled to Driver1n, a gate of transistor M2 is coupled to Driver2, a gate of transistor M3 is coupled to Driver3, and a gate of transistor M4 is coupled to Driver4. As will be understood by a person having ordinary skill in the art, during a charging mode, each of transistors $M_{1p}$, $M_{1n}$, and M3 may be in a conductive state and each of transistors M2 and M4 be in a non-conductive state to charge a capacitor C with an input voltage $V_{in}$. Further, during an output mode, each of transistors M2 and M4 may be in a conductive state and each of transistors $M_{1p}$, $M_{1n}$, and M3 may be in a non-conductive state to convey an output voltage $V_{NEG}$.

Figure 2:
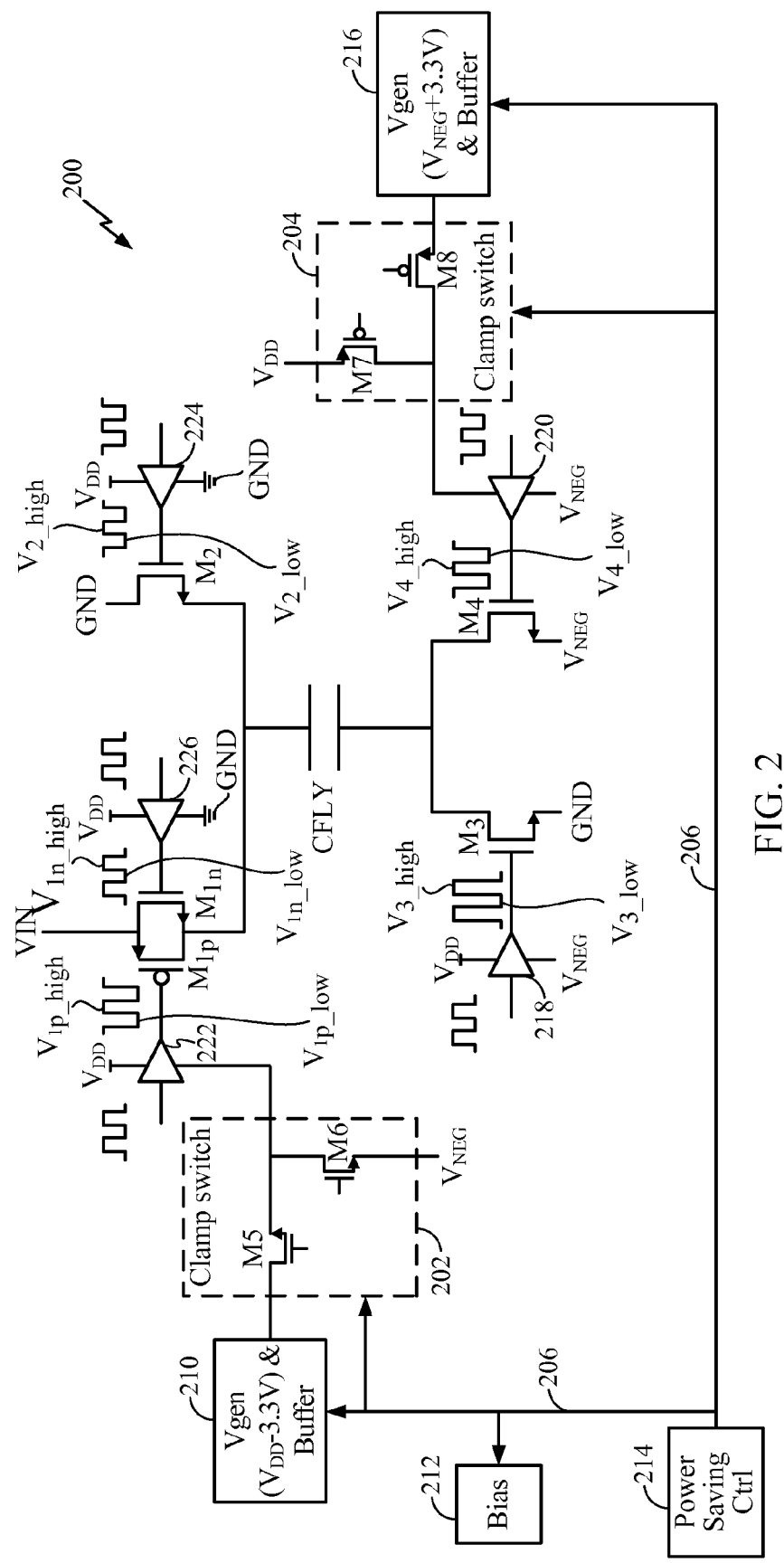
FIG. 2 is a circuit diagram of a charge pump including a plurality of clamp switches, in accordance with an exemplary embodiment of the present invention.

As will be appreciated by a person having ordinary skill in the art, a turn-on voltage of a switch (e.g., transistors M1-M4) should be sufficiently large for adequate efficiency, especially at high charge pump clock frequencies. Further, voltage buffers may be used to increase a gate-to-source voltage $V_{gs}$ above a supply voltage $V_{DD}$. FIG. 2 illustrates another charge pump 200, according to an exemplary embodiment of the present invention. Charge pump 200 includes a plurality of switches depicted as transistors M1-M4 and a capacitor $C_{FLY}$.

It is noted that transistor M1 comprises a complimentary switch including transistor $M_{1p}$ and transistor $M_{1n}$. As will be appreciated by a person having ordinary skill in the art, during a charging phase of charge pump 200, a first terminal of capacitor $C_{FLY}$ may be coupled to an input voltage $V_{IN}$ via transistor M1 and a second terminal of capacitor $C_{FLY}$ may be coupled to a ground voltage GND via transistor M3. Further, during an output phase of charge pump 200, the first terminal of capacitor $C_{FLY}$ may be coupled to ground voltage GND via transistor M2 and the second terminal of capacitor $C_{FLY}$ may be coupled to an output voltage $V_{NEG}$ via transistor M3.

As illustrated in FIG. 2, each transistor M1p, M1n, and M2-M4 has a gate coupled to a clock driver. More specifically, a gate of transistor $M_{1p}$ is coupled to a driver 222, a gate of transistor $M_{1n}$ is coupled to a driver 226, a gate of transistor M2 is coupled to a driver 224, a gate of transistor M3 is coupled to a driver 218, and a gate of transistor M4 is coupled to a driver 220. Each of drivers 218, 220, 222, 224, and 226 is configured to output a square wave for controlling a state of an associated transistor. Stated another way, each of driver 218, 220, 222, 224, and 226 has an output coupled to a gate of an associated transistor for controlling a state (i.e., conductive or non-conductive state) of the associated transistor.

Drivers 226 and 224 may each be configured to output a waveform (e.g., a square wave) having an upper rail voltage substantially equal to a supply voltage $V_{DD}$ and a lower rail voltage substantially equal to a ground voltage GND. Accordingly, voltage $V_{1n\_high}$ and voltage $V_{2\_high}$ are each substantially equal to supply voltage $V_{DD}$ and voltage $V_{1n\_low}$ and voltage $V_{2\_low}$ are each substantially equal to ground voltage GND. Further, driver 218 may each be configured to output a waveform (e.g., a square wave) having an upper rail voltage substantially equal to supply voltage $V_{DD}$ and a lower rail voltage substantially equal to an output voltage $V_{NEG}$. Accordingly, voltage $V_{3\_high}$ is substantially equal to supply voltage $V_{DD}$ and voltage $V_{3\_low}$ is substantially equal to output voltage $V_{NEG}$. Rail voltages of drivers 222 and 220 will be described more fully below.

Charge pump 200 also includes power savings control 214, a bias circuit 212, a voltage generator 210, and a voltage generator 216. Voltage generators 210 and 216 may be configured to generate a voltage at a desired level and bias circuit 212 may be configured for biasing one or more voltages internal to charge pump 200. Charge pump 200 further includes a clamp device 202, which is coupled to driver 222 and a clamp device 204, which is coupled to driver 220. Clamp device 202 includes a transistor M5 and a transistor M6. Transistor M5 has a drain coupled to voltage generator 210, a source coupled to driver 222 and gate configured to receive a control signal (e.g., a control voltage from power savings control 214).

Further, transistor M6 has a drain coupled to driver 220, a source configured to receive output voltage $V_{NEG}$, and a gate configured to receive a control signal (e.g., a control voltage from power savings control 214). Clamp device 204 includes a transistor M7 and a transistor M8. Transistor M7 has a source coupled to supply voltage $V_{DD}$, a drain coupled to driver 220 and gate configured to receive a control signal (e.g., a control voltage from power savings control 214). Further, transistor M8 has a drain coupled to driver 220, a source coupled to voltage generator 216, and a gate configured to receive a control signal (e.g., a control voltage from power savings control 214).

As noted above, a charge pump voltage level (i.e., an input voltage or an output voltage of the charge pump) may be compared with one or more voltage thresholds to determine whether the charge pump should be operating in a power saving mode or in a normal operating mode. By way of example only, if charge pump 200 is operating in a normal mode, the voltage level (e.g., the input voltage ($V_{in}$) or the output voltage ($V_{NEG}$) of charge pump 200) may be compared to a first threshold voltage (e.g., substantially 1.15 volts). If the voltage level is less than the first threshold voltage, charge pump 200 may transition into a power savings mode.

To transition to a power savings mode, one or more voltage generators, buffers, and/or bias circuits (e.g., voltage generator 210, voltage generator 216, and bias circuit 212) within the charge pump 200 may be turned off, and the output voltage (e.g., output voltage $V_{NEG}$) and supply voltage (e.g., supply voltage $V_{DD}$) may be used to supply one or more drivers (e.g., drivers 218, 220, 222, 224, and 226). Further, if charge pump 200 is operating in a power saving mode, the voltage level (e.g., the input voltage ($V_{in}$) or the output voltage ($V_{NEG}$) of charge pump 200) may be compared to a second threshold voltage (e.g., substantially 1.35 volts). If the voltage level is greater than the second threshold voltage, charge pump 200 may transition into a normal operating mode.

To transition to a normal mode of operation, one or more voltage generators (e.g., voltage generator 210 and voltage generator 216) within charge pump 200 may be turned on to limit voltage stress across one or more switches within charge pump 200, one or more drivers within charge pump 200, or any combination thereof. In one example, power saving control 214 may be configured to digitally compare a charge pump voltage level with one or more threshold voltages. As will be appreciated by a person having ordinary skill in the art, using different voltage levels for transitioning into and out of a power savings mode may limit, and possibly prevent, mistriggering (i.e., into and out of the power savings mode).

Figure 7A:
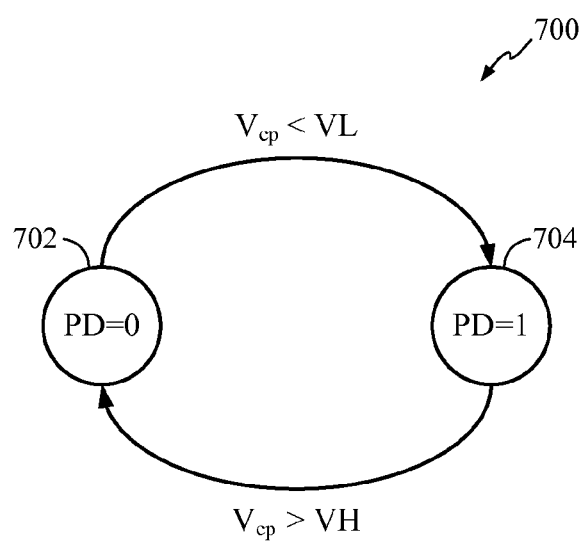
FIG. 7A illustrates a charger pump state diagram for static power saving, according to an exemplary embodiment of the present invention.
Figure 7B:
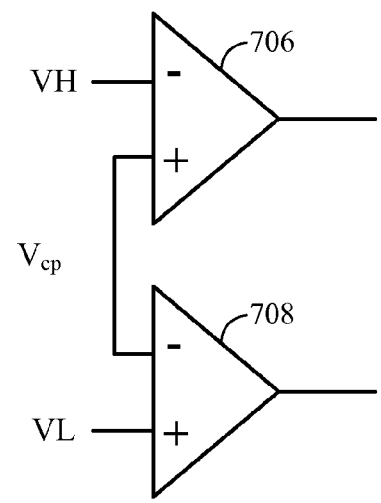
FIG. 7B illustrates circuitry for comparing a charge pump input reference voltage to a plurality of threshold voltages, in accordance with an exemplary embodiment of the present invention.

FIG. 7A illustrates a state diagram 700 for charge pump 200. While charge pump 200 is operating in a first mode 702, which comprises a normal operating mode, a charge pump voltage $V_{cp}$ (e.g., input voltage $V_{in}$) may be compared to a threshold voltage VL. If the charge pump voltage is less than threshold voltage VL (e.g., 1.15 volts), charge pump 200 may transition to a second mode 704, which comprises a power savings mode. While charge pump 200 is operating in second mode 704, the charge pump voltage $V_{cp}$ (e.g., input voltage $V_{in}$) may be compared to another threshold voltage VH (e.g., 1.35 volts). If the charge pump voltage is greater than threshold voltage VH, charge pump 200 may transition back to first mode 702, which comprises the normal operating mode. FIG. 7B illustrates circuitry including two comparators 706 and 708 for comparing a charge pump voltage ($V_{cp}$), which may comprise, for example only, input voltage Vin or output voltage $V_{NEG}$, to a plurality of threshold voltages (i.e., threshold voltage VL and threshold voltage VH).

A contemplated operation of charge pump 200 will now be described. Upon comparing a charge pump voltage level with one or more voltage thresholds and determining that charge pump should be operating in a normal mode, power saving control 214 may convey one or more control signals to clamp switch 202 to cause transistor M5 to operate in a conductive state and transistor M6 to operate in a non-conductive state. Further, power saving control 214 may convey one or more control signals to clamp switch 204 to cause transistor M8 to operate in a conductive state and transistor M7 to operate in a non-conductive state. Accordingly, a voltage conveyed from voltage generator 210 may be conveyed to driver 222 and a voltage conveyed from voltage generator 216 may be conveyed to driver 220. Therefore, in a normal operating mode, driver 222 may be configured to output a waveform (e.g., a square wave) having an upper rail voltage substantially equal to supply voltage $V_{DD}$ and a lower rail voltage substantially equal to supply voltage minus an offset voltage (e.g., $V_{DD}$–3.3 volts). As such, voltage $V_{1p\_high}$ is substantially equal to supply voltage $V_{DD}$ and voltage $V_{1p\_low}$ is substantially equal to $V_{DD}$–3.3 volts.

Further, driver 220 may be configured to output a waveform (e.g., a square wave) having an upper rail voltage substantially equal to output voltage $V_{NEG}$ plus an offset voltage (e.g., $V_{NEG}$+3.3 volts) and a lower rail voltage substantially equal to output voltage $V_{NEG}$. Accordingly, voltage $V_{4\_high}$ is substantially equal to output voltage $V_{NEG}$+3.3 volts and voltage $V_{4\_low}$ is substantially equal to output voltage $V_{NEG}$. As will be appreciated by a person having ordinary skill in the art, during the normal mode of operation, the gate-to-source voltages of transistors M1 and M4 are limited to a desired voltage (e.g., to 3.3 volts). It is noted that 3.3 volts is a non-limiting example of an "offset voltage" and that the offset voltage may be any suitable for device stress requirements.

Upon comparing a charge pump voltage level with one or more voltage thresholds and determining that charge pump should be operating in a power savings mode, power saving control 214 may convey one or more control signals to voltage generator 210, voltage generator 216, and bias circuit 212 for disabling voltage generator 210, voltage generator 216, and bias circuit 212. Further, power saving control 214 may convey one or more control signals to clamp switch 202 to cause transistor M5 to operate in a non-conductive state and transistor M6 to operate in a conductive state. Further, power saving control 214 may convey one or more control signals to clamp switch 204 to cause transistor M8 to operate in a non-conductive state and transistor M7 to operate in a conductive state. Accordingly, output voltage $V_{NEG}$ may be conveyed to driver 222 and supply voltage $V_{DD}$ may be conveyed to driver 220. Therefore, in a power savings mode, driver 222 may be configured to output a waveform (e.g., a square wave) having an upper rail voltage substantially equal to supply voltage $V_{DD}$ and a lower rail voltage substantially equal to output voltage $V_{NEG}$.

As such, voltage $V_{1p\_high}$ is substantially equal to supply voltage $V_{DD}$ and voltage $V_{1p\_low}$ is substantially equal to output voltage $V_{NEG}$. Further, driver 220 may be configured to output a waveform (e.g., a square wave) having an upper rail voltage substantially equal to supply voltage $V_{DD}$ and a lower rail voltage substantially equal to output voltage $V_{NEG}$. Accordingly, voltage $V_{4\_high}$ is substantially equal to supply voltage $V_{DD}$ and voltage $V_{4\_low}$ is substantially equal to output voltage $V_{NEG}$. As will be appreciated by a person having ordinary skill in the art, during the power savings mode of operation, one or more circuits (e.g., voltage generator 210, voltage generator 216, and bias circuit 212) may be turned off, and one or more clock drivers of a charge pump (e.g., drivers 218, 220, and 222) can be directly connected to a supply voltage (i.e., supply voltage $V_{DD}$) and an output voltage (i.e., output voltage $V_{NEG}$), which reduces static power consumption.

Figure 3A:
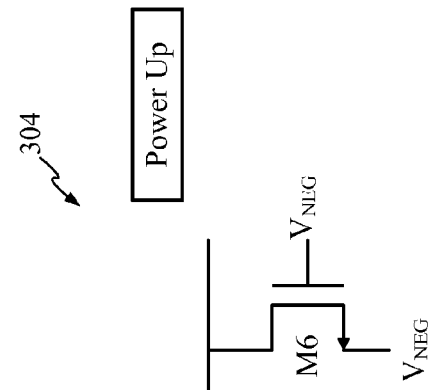
FIG. 3A is a circuit diagram of a first clamp switch during a first mode of operation of a charge pump, in accordance with an exemplary embodiment of the present invention.

FIG. 3A is a circuit diagram of clamp switch 202 during a power savings operating mode (e.g., when input voltage $V_{in}$ (see FIG. 2) is below a threshold). During a power savings operation mode, transistor M5 receives a "low" voltage (e.g., output voltage $V_{NEG}$) and is, therefore, operating in a non-conductive state. Further, transistor M6 receives a "high" voltage (e.g., supply voltage $V_{DD}$) and is, therefore, operating in a conductive state. Accordingly, output voltage $V_{NEG}$ is conveyed to driver 222 (see FIG. 2). As a result, driver 222 may be configured to output a waveform (e.g., a square wave) having an upper rail voltage substantially equal to supply voltage $V_{DD}$ and a lower rail voltage substantially equal to output voltage $V_{NEG}$.

Figure 3B:
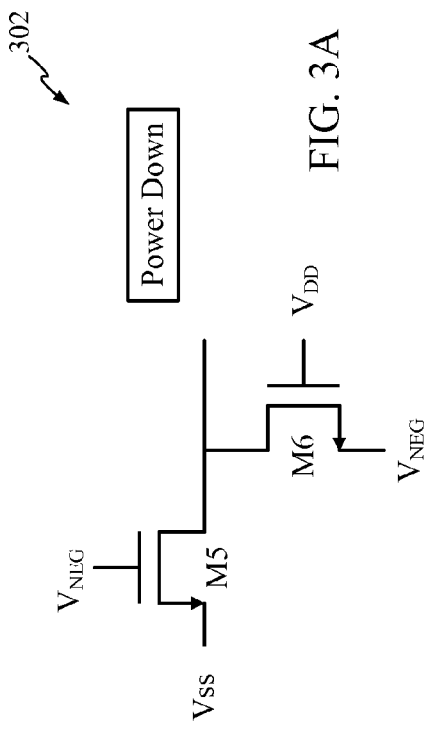
FIG. 3B is a circuit diagram of the first clamp switch during a second mode of operation of the charge pump, in accordance with an exemplary embodiment of the present invention.

FIG. 3B is a circuit diagram of clamp switch 202 during a normal operating mode (e.g., when input voltage $V_{in}$ (see FIG. 2) is above a threshold). During a normal operation mode, transistor M5 receives a "high" voltage (e.g., supply voltage $V_{DD}$) and is, therefore, operating in a conductive state. Further, transistor M6 receives a "low" voltage (e.g., output voltage $V_{NEG}$) and is, therefore, operating in a non-conductive state. Accordingly, a voltage $V_n$, which comprises a supply voltage minus an offset voltage (e.g., supply voltage $V_{DD}$–3.3 volts) is conveyed to driver 222 (see FIG. 2). As a result, driver 222 may be configured to output a waveform (e.g., a square wave) having an upper rail voltage substantially equal to supply voltage $V_{DD}$ and a lower rail voltage substantially equal to supply voltage minus an offset voltage (e.g., $V_{DD}$–3.3V).

Figure 3C:
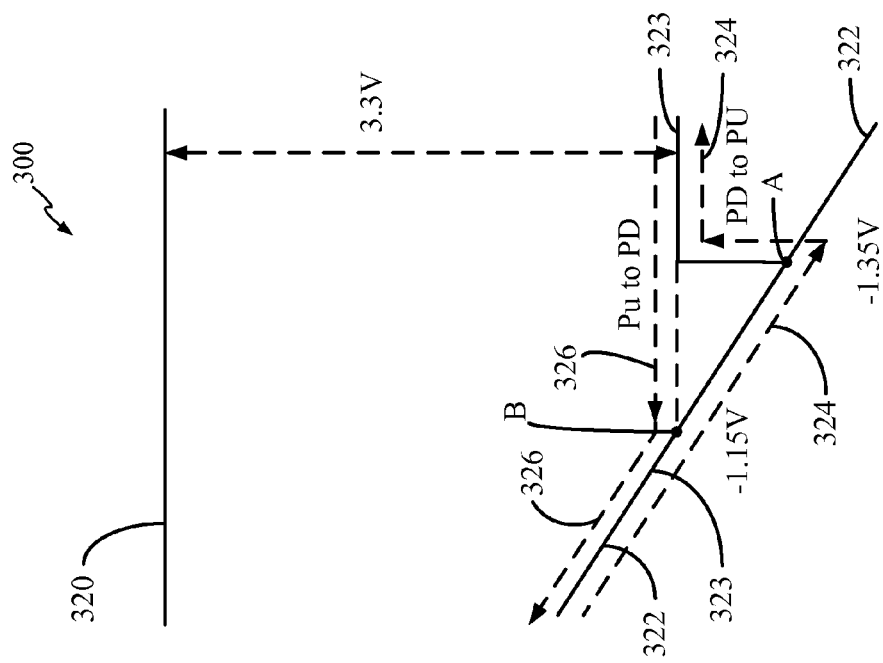
FIG. 3C is a plot illustrating various voltage levels and mode transitions of a charge pump, according to an exemplary embodiment of the present invention.

FIG. 3C is a plot 320 including a waveform 320, which comprises a supply voltage (e.g., supply voltage $V_{DD}$) of a charge pump, a waveform 322, which comprises an output voltage (e.g., output voltage $V_{NEG}$) of the charge pump, and a waveform 323, which comprises a lower rail voltage conveyed to driver 222. In this example, the supply voltage is equal to 2.15 volts. It is further noted that an absolute value of output voltage $V_{NEG}$ is equal to input voltage $V_{in}$.

Further, plot 300 illustrates a transition from a normal operating mode to a power saving mode power as an absolute value of the output voltage becomes less than a threshold voltage, and a transition from a power savings mode to a normal mode as the absolute value of the output voltage becomes greater than another threshold voltage. More specifically, as the absolute value of output voltage 322 becomes greater than a threshold voltage (i.e., threshold voltage VH (e.g., 1.35 volts)) at node A, the charge pump transitions from a power savings mode ("PD") to a normal mode ("PU"), as shown by line 324. Further, as the absolute value of output voltage 322 becomes less than another threshold voltage (i.e., threshold voltage VL (e.g., 1.15 volts)) at node B, the charge pump transitions from a normal mode ("PU") to a power savings mode ("PD"), as shown by line 326. Accordingly, in this example, upon transitioning from a power savings mode to a normal mode, a maximum gate-to-source voltage of transistor $M_{1p}$ (see FIG. 2) is limited to substantially 3.3 volts (i.e., from $V_{DD}$ to $V_{DD}$−3.3 volts).

Figure 4A:
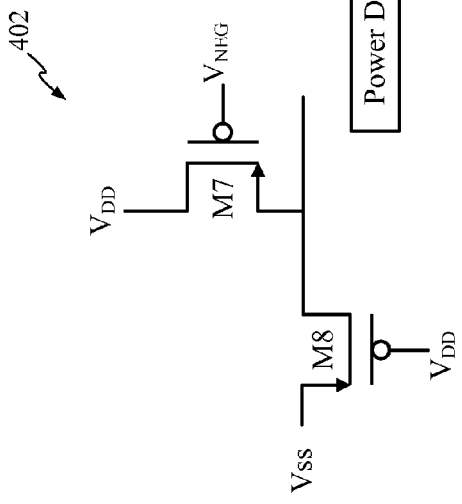
FIG. 4A is a circuit diagram of a second clamp switch during a first mode of operation of the charge pump, in accordance with an exemplary embodiment of the present invention.

FIG. 4A is a circuit diagram of clamp switch 204 during a power savings operating mode (e.g., when input voltage $V_{in}$ (see FIG. 2) is below a threshold). During a power savings operating mode, transistor M7 receives a "low" voltage (e.g., output voltage $V_{NEG}$) and is, therefore, operating in a conductive state. Further, transistor M8 receives a "high" voltage (e.g., supply voltage $V_{DD}$) and is, therefore, operating in a non-conductive state. Accordingly, supply voltage $V_{DD}$ is conveyed to driver 220 (see FIG. 2). As a result, during a power savings operational mode, driver 220 has an upper rail voltage substantially equal to supply voltage $V_{DD}$ and a lower rail voltage substantially equal to output voltage $V_{NEG}$.

Figure 4B:
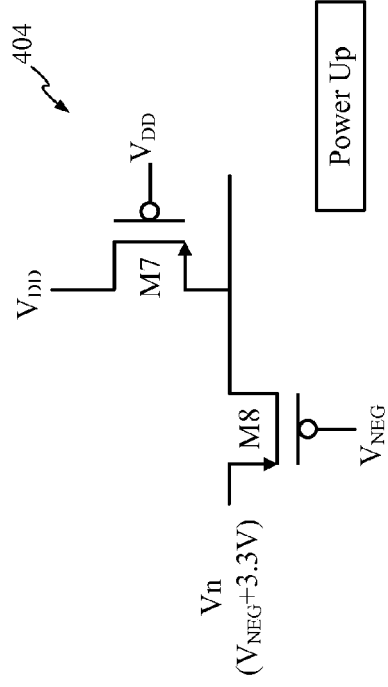
FIG. 4B is a circuit diagram of the second clamp switch during a second mode of operation of the charge pump, in accordance with an exemplary embodiment of the present invention.

FIG. 4B is a circuit diagram of clamp switch 202 during a normal operating mode (e.g., when input voltage $V_{in}$ (see FIG. 2) is above a threshold). During a normal operation mode, transistor M7 receives a "high" voltage (e.g., supply voltage $V_{DD}$) and is, therefore, operating in a non-conductive state. Further, transistor M8 receives a "low" voltage (e.g., output voltage $V_{NEG}$) and is, therefore, operating in a conductive state. Accordingly, a voltage Vn, which comprises an output voltage plus an offset voltage (e.g., output voltage $V_{NEG}$+3.3 volts) is conveyed to driver 220 (see FIG. 2). As a result, during a normal operating mode, driver 220 has an upper rail voltage substantially equal to output voltage $V_{NEG}$ plus an offset voltage (e.g., $V_{NEG}$+3.3 volts) and a lower rail voltage substantially equal to output voltage $V_{NEG}$.

Figure 4C:
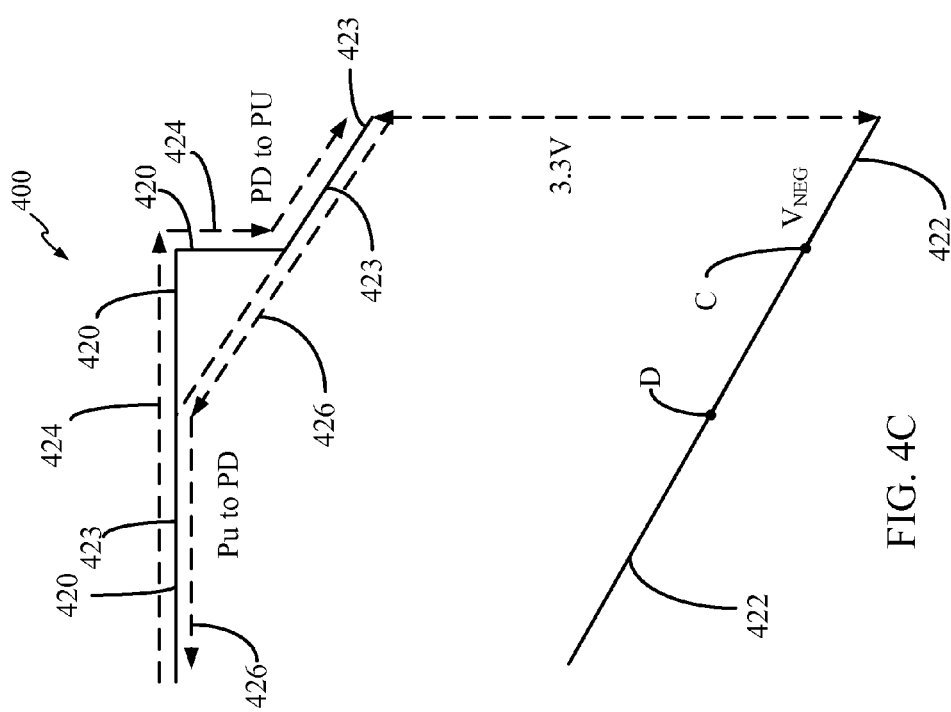
FIG. 4C is another plot illustrating various voltage levels and mode transitions of a charge pump, according to an exemplary embodiment of the present invention.

FIG. 4C is a plot 400 including a waveform 420, which comprises a supply voltage (e.g., supply voltage $V_{DD}$) of a charge pump, a waveform 422, which comprises an output voltage (e.g., output voltage $V_{NEG}$) of the charge pump, and a waveform 423, which comprises an upper rail voltage conveyed to driver 220. In this example, the supply voltage is equal to 2.15V.

Further, plot 400 illustrates a transition from a normal operating mode to a power saving mode power as an absolute value of the output voltage becomes less than a threshold voltage, and a transition from a power savings mode to a normal mode as the absolute value of the output voltage becomes greater than another threshold voltage. More specifically, as the absolute value of output voltage 422 becomes greater than a threshold voltage (i.e., threshold voltage VH (e.g., 1.35 volts)) at node C, the charge pump transitions from a power savings mode ("PD") to a normal mode ("PU"), as shown by line 424. Further, as the absolute value of output voltage 422 becomes less than another threshold voltage (i.e., threshold voltage VL (e.g., 1.15 volts)) at node D, the charge pump transitions from a normal mode ("PU") to a power savings mode ("PD"), as shown by line 426. Accordingly, in this example, upon transitioning from a power savings mode to a normal mode, a maximum gate-to-source voltage of transistor M4 (see FIG. 2) is limited to substantially 3.3 volts (i.e., from $V_{NEG}$ to $V_{NEG}$+3.3 volts).

Figure 5:
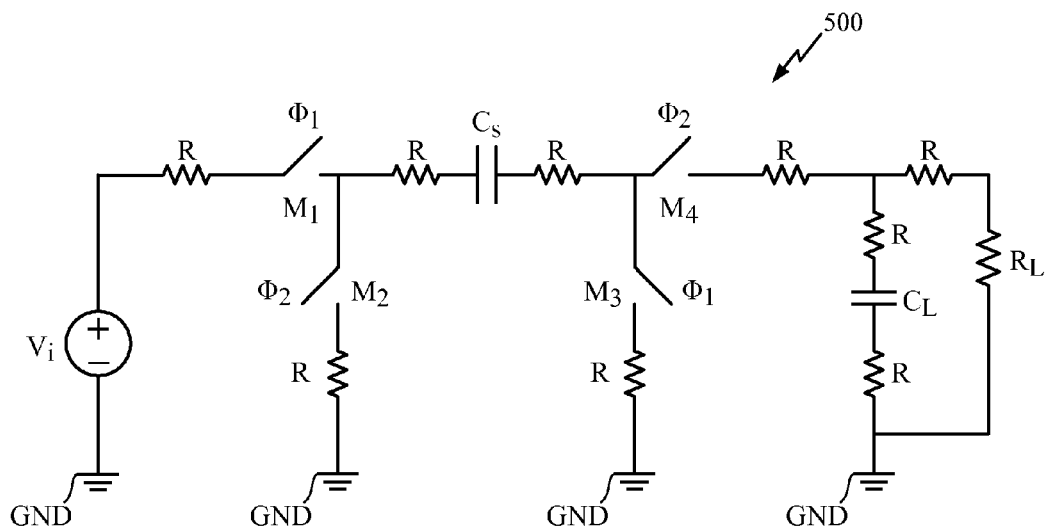
FIG. 5 is a circuit diagram of a charge pump, according to an exemplary embodiment of the present invention.
Figure 6:
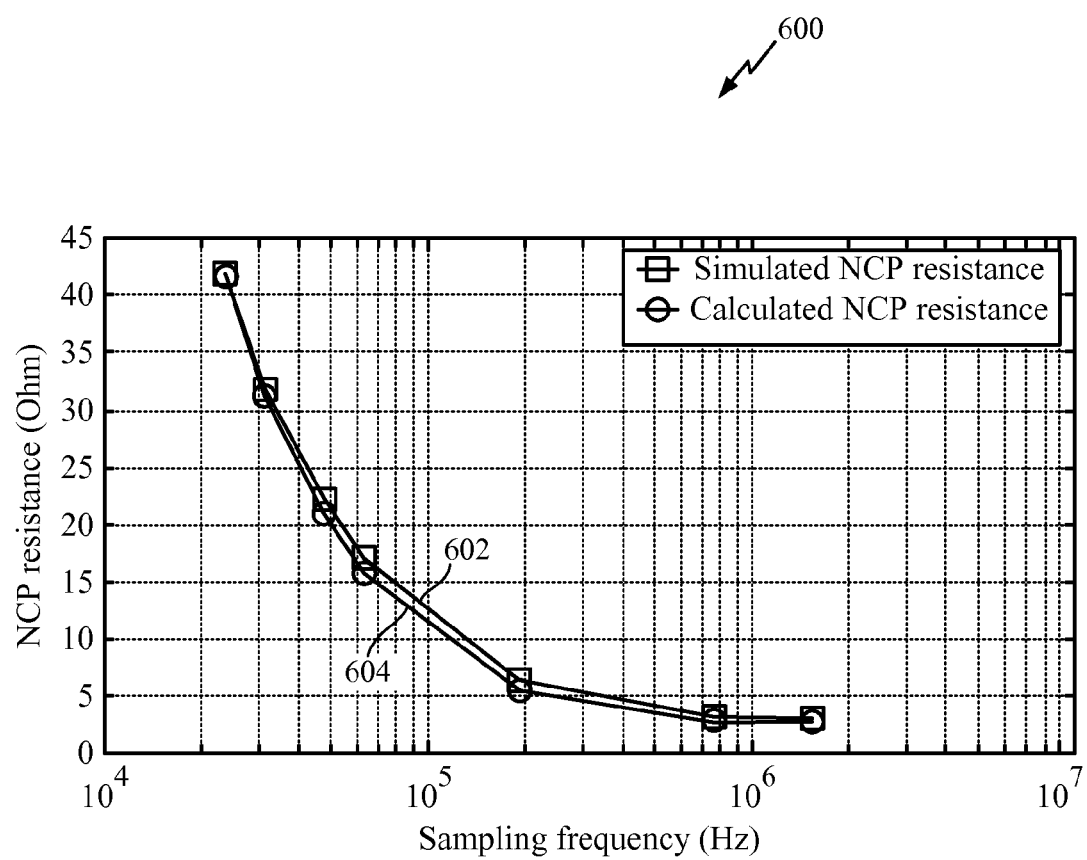
FIG. 6 is a plot illustrating negative charge pump resistance relative to sampling frequencies.

FIG. 5 is a circuit diagram 500 of a charge pump including parasitic resistance and terminal connections. FIG. 6 is a plot 600 having a waveform 602 identifying simulated negative charge pump resistance relative to sampling frequencies and a waveform 604 identifying calculated negative charge pump resistance relative to the sampling frequencies. As illustrated in FIG. 6, as clock frequencies decrease, negative charge pump resistance increases. A negative charge pump resistance is shown in the following equations:

$$R_{NCP}=1/fC_s * \lfloor (1-e^{-(\tau_1+\tau_2)})/\lfloor (1-e^{-\tau_1})*(1-e^{-\tau_2}) \rfloor \rfloor \quad (1)$$

$$\tau_1 = t_1/(R_x C_s) = D_1/(R_x f C_s) \quad (2)$$

$$\tau_2 = t_2/(R_y C_s) = D_2/(R_y f C_s) \quad (3)$$

Equation 1 is an analytical equation for calculating the charge pump resistance based on the embodiment illustrated in FIG. 5. Variable $R_x$ is a total path resistance in a charging mode including a summation of all parasitic resistances R and turn-on resistances for switches M1 and M3. Further, variable $R_y$ is a total path resistance in an output mode including a summation of all parasitic resistances R and turn-on resistances of switches M2 and M4. Variable $C_s$ is the fly capacitance, variable $t_1$ is a charging mode time, and variable $t_2$ is an output mode time. According to equation 1, the charge pump resistance is dominated by the parasitic resistance and switch turn-on resistance at relatively high clock frequencies. In addition, the charge pump resistance is less related to the parasitic resistance and switch turn-on resistance, and inversely proportional to the charge pump clock frequency at relatively low clock frequencies.

As will be appreciated by a person having ordinary skill in the art, at low clock frequencies, charge pump resistance may be dominated by 1/fc and, therefore, relatively small switch sizes may be acceptable. According to one exemplary embodiment of the present invention, at low clock frequencies, at least a portion of one or more of switches of a charge pump may be disabled, thus reducing dynamic power consumption.

Figure 8:
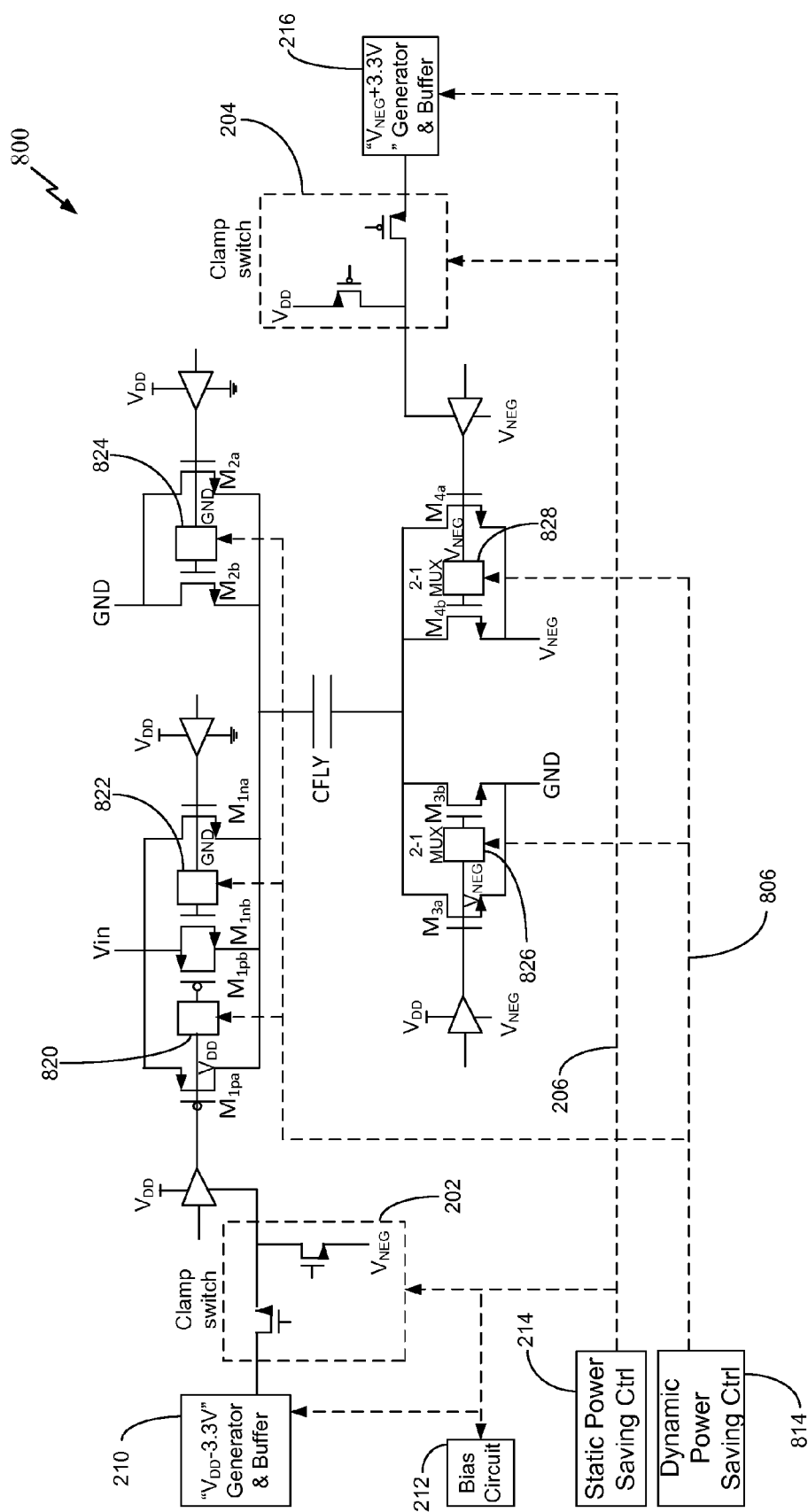
FIG. 8 illustrates a charge pump configured for reducing dynamic and static power consumption, in accordance with an exemplary embodiment of the present invention.

FIG. 8 is yet another charge pump 800, according to an exemplary embodiment of the present invention. Charge pump 800 includes each element of charge pump 200, as described above. Further, according to one exemplary embodiment, each switch of charge pump 800 (i.e., transistors M1-M4) may be divided into multiple portions. Accordingly, switch $M_{1p}$ (see FIG. 2) is divided into portions $M_{1pa}$ and $M_{1pb}$, switch $M_{1n}$ (see FIG. 2) is divided into portions $M_{1na}$ and $M_{1nb}$, switch $M_2$ (see FIG. 2) is divided into portions $M_{2a}$ and $M_{2b}$, switch $M_3$ (see FIG. 2) is divided into portions $M_{3a}$ and $M_{3b}$, and switch $M_4$ (see FIG. 2) is divided into portions $M_{4a}$ and $M_{4b}$. Charge pump 800 further includes multiplexers 820, 822, 824, 826, and 828.

In addition, charge pump 800 includes a power savings control 814 configured to compare (e.g., digitally compare) a clock frequency of charge pump 800 with a threshold frequency. Moreover, upon determining that a clock frequency of charge pump 800 is below a threshold frequency, power savings control 814 may be configured to convey one or more control signals to one or more of multiplexers 820, 822, 824, 826, and 828 for disabling at least a portion of one or more switches M1-M4. More specifically, upon determining that a clock frequency of charge pump 800 is below a threshold frequency, power savings control 814 may convey a control signal to multiplexer 820 for disabling switch portion $M_{1pb}$, a control signal to multiplexer 822 for disabling switch portion $M_{1nb}$, a control signal to multiplexer 824 for disabling switch portion $M_{2b}$, a control signal to multiplexer 826 for disabling switch portion $M_{3b}$, and a control signal to multiplexer 828 for disabling switch portion $M_{4b}$.

As one non-limiting example, if a clock frequency of charge pump 800 is below substantially 200 KHz, at least a portion of one or more of switches M1-M4 may be disabled. It is noted that if a portion of a switch is disabled, the other portion of the switch may be enabled, and thus may still receive a signal from an associated driver. For example, if switch portion $M_{1nb}$ disabled (i.e., via power saving control 814 and multiplexer 822), switch portion $M_{1na}$ may still receive a signal from driver 226. As will be appreciated by a person having ordinary skill in the art, reducing a size of one or more switches within a charge pump (i.e., by disabling a portion of one or more switches), may reduce dynamic power consumption of the switch.

Figure 9:
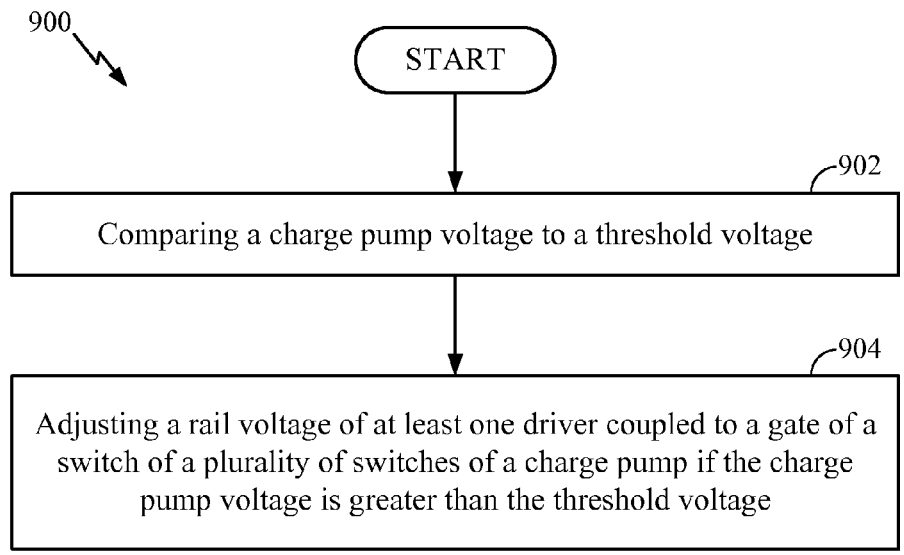
FIG. 9 is a flowchart illustrating a method, according to an exemplary embodiment of the present invention.

FIG. 9 is a flowchart illustrating a method 900, in accordance with one or more exemplary embodiments. Method 800 may include comparing a charge pump voltage to a threshold voltage (depicted by numeral 902). Method 900 may also include adjusting a rail voltage of at least one driver coupled to a gate of a switch of a plurality of switches of a charge pump if the charge pump voltage is greater than the threshold voltage (depicted by numeral 904).

Figure 10:
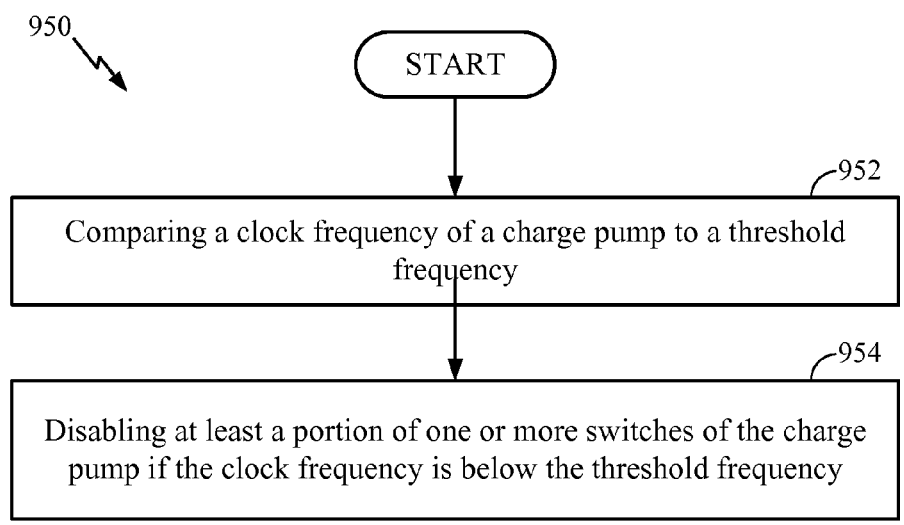
FIG. 10 is a flowchart illustrating another method, according to an exemplary embodiment of the present invention.

FIG. 10 is a flowchart illustrating another method 950, in accordance with one or more exemplary embodiments. Method 950 may include comparing a clock frequency of a charge pump to a threshold frequency (depicted by numeral 952). Method 950 may also include disabling at least a portion of one or more switches of the charge pump if the clock frequency is below the threshold frequency (depicted by numeral 954).

Exemplary embodiments, as described herein, may reduce static power consumption of a charge pump, dynamic power consumption of a charge pump, or both. As one example, power consumption of a class-H negative charge pump may be reduced by substantially 280 uW of power, which may comprise 11% of quiescent class-H power consumption. Although embodiments of the invention are described in reference to a negative charge pump, embodiments of the present invention are not so limited. Rather, embodiments of the present invention may applicable with any suitable charge pump.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A charge pump, comprising:
a plurality of switches, each switch of the plurality having a gate coupled to a dedicated driver of a plurality of drivers; and
at least one clamp switch coupled to at least one driver of the plurality of drivers and configured to adjust at least one rail voltage of the at least one driver if an input voltage into the charge pump is greater than a threshold voltage regardless of an output voltage of the charge pump,
wherein the at least one clamp switch includes a first clamp switch coupled to a first driver of the plurality of drivers and a second clamp switch coupled to a second driver of the plurality of drivers.

2. The charge pump of claim 1, wherein
the first clamp switch is coupled to a first switch of the plurality of switches via a dedicated driver of the plurality of drivers, the first switch further coupled to an input voltage of the charge pump; and
the second clamp switch is coupled to a second switch of the plurality of switches via a dedicated driver of the plurality of drivers, the second switch further coupled to the output voltage of the charge pump.

3. The charge pump of claim 2, the first clamp switch configured to:
cause a square wave having an upper rail voltage substantially equal to a supply voltage and a lower rail voltage substantially equal to a supply voltage minus an offset voltage to be conveyed to a gate of the first switch if the input voltage is greater than the threshold voltage; and
cause a square wave having a upper rail voltage substantially equal to the supply voltage and a lower rail voltage substantially equal to the output voltage to be conveyed to a gate of the first switch if the input voltage is not greater than the threshold voltage.

4. The charge pump of claim 2, the second clamp switch configured to:
cause a square wave having an upper rail voltage substantially equal to the output voltage plus an offset voltage and a lower rail voltage substantially equal to the output voltage to be conveyed to a gate of the first switch if the input voltage is greater than the threshold voltage; and
cause a square wave having an upper rail voltage substantially equal to a supply voltage and a lower rail voltage substantially equal to the output voltage to be conveyed to a gate of the first switch if the input voltage is not greater than the threshold voltage.

5. The charge pump of claim 1, further comprising a control module for conveying a control voltage to the at least one clamp switch.

6. The charge pump of claim 1, further comprising at least one voltage generator for generating a voltage to adjust the rail voltage of the at least one driver.

7. The charge pump of claim 1, wherein the first clamp switch is configured to adjust a lower rail voltage of the first driver if an the input voltage is greater than a the threshold voltage and the second clamp switch is configured to adjust an upper rail voltage of the second driver if an the input voltage is greater than a the threshold voltage.

8. The charge pump of claim 1, further comprising a plurality of multiplexers, each multiplexer of the plurality of multiplexers coupled to a portion of an associated switch of the plurality of switches and configured to disable the portion of the associated switch if a clock frequency of the charge pump is below a threshold frequency.

9. The method of claim 1, wherein each of the plurality of drivers is configured to output a respective waveform.

10. A charge pump, comprising:
a first plurality of switches for charging an energy storage element during a charging phase;
a second plurality of switches for conveying an output voltage via the energy storage element during an output phase;
a first clamp configured to modify a voltage applied to a first switch of the first plurality of switches if an input voltage into the charge pump is greater than a threshold voltage regardless of the output voltage of the charge pump; and
a second clamp configured to modify a voltage applied to a first switch of the second plurality of switches if the input voltage is greater than the threshold voltage.

11. The charge pump of claim 10, the first switch of the first plurality of switches coupled between the energy storage element and an input and configured to receive the input voltage at the input.

12. The charge pump of claim 10, the first switch of the second plurality of switches coupled between the energy storage element and an output and configured to convey the output voltage at the output during the output phase.

13. The charge pump of claim 10, the first clamp switch configured to cause a supply voltage to be conveyed to a gate of the first switch of the first plurality of switches during the charging phase and an output voltage to be conveyed to the gate of the first switch of the first plurality of switches during the output phase while in a power savings mode of operation.

14. The charge pump of claim 10, the first clamp switch configured to cause a supply voltage to be conveyed to a gate of the first switch of the first plurality of switches during the charging phase and a voltage substantially equal to the supply voltage minus an offset to be conveyed to the gate of the first switch of the first plurality of switches during the output phase while in a normal mode of operation.

15. The charge pump of claim 10, the second clamp switch configured to cause a supply voltage to be conveyed to a gate of the first switch of the second plurality of switches during the output phase and the output voltage to be conveyed to the gate of the first switch of the second plurality of switches during the charging phase while operating in a power savings mode of operation.

16. The charge pump of claim 10, the second clamp switch configured to cause a voltage substantially equal to the output voltage plus an offset to be conveyed to a gate of the first switch of the second plurality of switches during the output phase and the output voltage to be conveyed to the gate of the first switch of the second plurality of switches during the charging phase while in a normal mode of operation.

17. The charge pump of claim 10, further comprising a controller configured to:
compare a charge pump voltage to a first threshold voltage and a second threshold voltage, the second threshold voltage greater than the first threshold voltage;
cause the charge pump to operate in a power savings mode if the charge pump voltage is less than the first threshold; and
cause the charge pump to operate in a normal mode if the charge pump voltage is greater than the second threshold voltage.

18. The charge pump of claim 10, further comprising a control configured to disable at least a portion of at least one switch of at least one of the first plurality of switches and the second plurality of switches if a clock frequency of the charge pump is below a threshold frequency.

19. A method, comprising:
comparing a charge pump voltage of a charge pump to a threshold voltage, wherein the comparing comprises comparing the charge pump voltage to a first threshold voltage while the charge pump is in a power savings mode of operation and comparing the charge pump voltage to a second threshold voltage while the charge pump is in a normal mode of operation;
adjusting a rail voltage of at least one driver coupled to a gate of a switch of a plurality of switches of the charge pump if the charge pump voltage is greater than the second threshold voltage; and
conveying at least one signal from a controller to adjust the rail voltage of the at least one driver.

20. The method of claim 19, the adjusting a rail voltage of at least one driver comprising adjusting a rail voltage of a first driver coupled to a first switch of the plurality of switches configured to receive the charge pump voltage and adjusting a rail voltage of a second driver coupled to a second switch configured to convey an output voltage.

21. The method of claim 19, the comparing a charge pump voltage to a threshold voltage comprising comparing an input voltage of the charge pump to the threshold voltage.

22. The method of claim 19, the adjusting comprising limiting a gate-to-source voltage of the switch to substantially 3.3 volts.

23. A method, comprising:
comparing a clock frequency of a charge pump to a threshold frequency;
disabling at least a portion of one or more switches of the charge pump while enabling another portion of the one or more switches if the clock frequency is below the threshold frequency; and
conveying a control signal to a plurality of multiplexers, each multiplexer of the plurality coupled to a switch of the one or more switches to disable at least the portion of the one or more switches upon receipt of the control signal.

24. The method of claim 23, the disabling comprising disabling at least a portion of the one or more switches of the charge pump if the clock frequency is below 200 KHz.

25. A non-transitory computer-readable storage medium storing instructions that when executed by a processor cause the processor to perform instructions for operating a charge pump, the instructions comprising:
comparing a charge pump voltage of a charge pump to a threshold voltage, wherein the comparing comprises comparing the charge pump voltage to a first threshold voltage while the charge pump is in a power savings mode of operation and comparing the charge pump voltage to a second threshold voltage while the charge pump is in a normal mode of operation;
adjusting a rail voltage of at least one driver coupled to a gate of a switch of a plurality of switches of the charge pump if the charge pump voltage is greater than the second threshold voltage; and
conveying at least one signal from a controller to adjust the rail voltage of the at least one driver.

26. A non-transitory computer-readable storage medium storing instructions that when executed by a processor cause the processor to perform instructions for operating a charge pump, the instructions comprising:
comparing a clock frequency of a charge pump to a threshold frequency;
disabling at least a portion of one or more switches of the charge pump while enabling another portion of the one or more switches if the clock frequency is below the threshold frequency; and
conveying a control signal to a plurality of multiplexers, each multiplexer of the plurality coupled to a switch of the one or more switches to disable at least the portion of the one or more switches upon receipt of the control signal.

27. A device, comprising:
means for comparing a charge pump voltage of a charge pump to a threshold voltage, wherein the means for comparing is configured to compare the charge pump voltage to a first threshold voltage while the charge pump is in a power savings mode of operation and comparing the charge pump voltage to a second threshold voltage while the charge pump is in a normal mode of operation;
means for adjusting a rail voltage of at least one driver coupled to a gate of a switch of a plurality of switches of the charge pump if the charge pump voltage is greater than the second threshold voltage; wherein the means for adjusting a rail voltage of at least one driver conveys at least one signal from a controller to adjust the rail voltage of the at least one driver.

28. A device, comprising:
means for comparing a clock frequency of a charge pump to a threshold frequency; and
means for disabling at least a portion of one or more switches of the charge pump while enabling another portion of the one or more switches if the clock frequency is below the threshold frequency, wherein the means for disabling at least a portion of one or more switches conveys a control signal to a plurality of multiplexers, each multiplexer of the plurality coupled to a switch of the one or more switches to disable the at least a portion of the one or more switches upon receipt of the control signal.

* * * * *